(12) United States Patent
Manzara et al.

(10) Patent No.: US 8,703,877 B2
(45) Date of Patent: Apr. 22, 2014

(54) POLYMERIC COMPOSITIONS AND METHOD OF MAKING AND ARTICLES THEREOF

(75) Inventors: Anthony P. Manzara, Lake Elmo, MN (US); Michael D. Crandall, North Oaks, MN (US); Joshua R. Wurst, North St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 676 days.

(21) Appl. No.: 12/943,116

(22) Filed: Nov. 10, 2010

(65) Prior Publication Data

US 2011/0112254 A1    May 12, 2011

Related U.S. Application Data

(60) Provisional application No. 61/260,072, filed on Nov. 11, 2009.

(51) Int. Cl.
*C08F 8/30* (2006.01)
*C08F 281/00* (2006.01)

(52) U.S. Cl.
USPC ............... 525/374; 525/330.5; 525/333.7; 525/375; 525/376; 525/479

(58) Field of Classification Search
USPC ......... 525/275, 279, 293, 296, 298, 418, 450, 525/452, 453, 455, 474, 476, 479, 540, 525/330.5, 333.7, 374, 375, 457
See application file for complete search history.

(56) References Cited

U.S. PATENT DOCUMENTS

| | | |
|---|---|---|
| RE24,906 E | 12/1960 | Ulrich |
| 3,859,261 A * | 1/1975 | Breslow ............... 525/61 |
| 3,941,751 A * | 3/1976 | Breslow ............. 525/333.9 |
| 4,245,061 A * | 1/1981 | Tachi et al. ............ 525/286 |
| 4,277,593 A | 7/1981 | Scheve |
| 4,940,737 A | 7/1990 | Braatz et al. |
| 4,962,213 A | 10/1990 | Frankel et al. |
| 5,580,697 A | 12/1996 | Keana et al. |
| 5,681,904 A | 10/1997 | Manzara |
| 5,759,666 A | 6/1998 | Carlson |
| 6,365,693 B1 | 4/2002 | Hung |
| 6,491,903 B1 | 12/2002 | Forster et al. |
| 6,890,995 B2 | 5/2005 | Kolb |
| 6,893,718 B2 | 5/2005 | Melancon |
| 7,795,355 B2 | 9/2010 | Matyjaszewski et al. |
| 2003/0157268 A1 | 8/2003 | Gutowski |
| 2005/0096454 A1 | 5/2005 | Emrick |
| 2006/0276595 A1 | 12/2006 | Baran, Jr. et al. |
| 2007/0123691 A1 | 5/2007 | Wilson |
| 2007/0154627 A1 | 7/2007 | Lehman, Jr. et al. |
| 2008/0103273 A1 | 5/2008 | Tang et al. |
| 2010/0098761 A1 | 4/2010 | Song |
| 2010/0125120 A1 | 5/2010 | Crandall |
| 2010/0159011 A1 | 6/2010 | Lian et al. |
| 2010/0324222 A1 | 12/2010 | Hung et al. |
| 2010/0324234 A1 | 12/2010 | Hung et al. |

FOREIGN PATENT DOCUMENTS

| | | |
|---|---|---|
| EP | 0 633 280 | 1/1995 |
| WO | WO 99/10423 | 3/1999 |
| WO | WO 2006/060556 | 6/2006 |
| WO | WO 2007/035296 | 3/2007 |

OTHER PUBLICATIONS

Jiao, C. et al European Polymer Journal vol. 41 pp. 1204-1211 published Jun. 2005.*
Bertrand, G. and C. Wentrup, "Nitrile Imines: From Matrix Characterization to Stable Compounds," *Angewandte Chemie International English Edition*, vol. 33, Issue 5, (1994) pp. 527-545.
Billiet, "Combining 'Click' Chemistry and Step-Growth Polymerization for the Generation of Highly Functionalized Polyesters", Journal of Polymer Science: Part A: Polymer Chemistry, 2008, vol. 46, pp. 6552-6564.
Canalle, "Copper-Free Clickable Coatings", Advanced Functional Materials, 2009, vol. 19, pp. 3464-3470.
Damiron, "Functionalized Random Copolymers from Versatile One-Pot Click Chemistry/ATRP Tandems Approaches", Journal of Polymer Science: Part A: Polymer Chemistry, 2009, vol. 47, pp. 3803-3813.
Johnson, "Synthesis of Degradable Model Networks via ATRP and Click Chemistry", Journal of the American Chemical Society, Apr. 27, 2006, vol. 128, pp. 6564-6565.
Katritzky, "Preparation and Characterization of 1,2,3-Triazole-Cured Polymers from Endcapped Azides and Alkynes", Journal of Polymer Science: Part A: Polymer Chemistry, 2008, vol. 46, pp. 238-256.
Keicher, "Isocyanate-Free Curing of Glycidyl-Azide-Polymer (GAP) with Bis-Propargyl-Succinate", Fraunhofer ICT Annual Conference, Jun. 24-27, 2008, Karlsruhe, Germany, pp. 1-13.
Koshar, "Bis(perfluoroalkylsulfonyl)methanes and Related Disulfones", Journal of Organic Chemistry, 1973, vol. 38, No. 19, pp. 3358-3363.
Meldal, "Cu-Catalyzed Azide-Alkyne Cycloaddition", Chemical Reviews, Aug. 13, 2008, vol. 108, pp. 2952-3015.
Parrish, "Soluble Camptothecin Derivatives Prepared by Click Cycloaddition Chemistry on Functional Aliphatic Polyesters", American Chemical Society, Dec. 13, 2006, pp. A-E.
Textbook of Polymer Science, F.W. Billmeyer, Jr., ed. Wiley Interscience, Second Edition (1971) pp. 84-85.
White, "Toward the Syntheses of Universal Ligands for Metal Oxide Surfaces: Controlling Surface Functionality through Click Chemistry", Journal of the American Chemical Society, Aug. 16, 2006, vol. 128, pp. 11356-11357.
International Search Report for PCT/US2010/056104, dated Jul. 21, 2011, 5 pgs.

* cited by examiner

*Primary Examiner* — Irina S Zemel
*Assistant Examiner* — Jeffrey Lenihan
(74) *Attorney, Agent, or Firm* — Julie Lapos-Kuchar; James A. Baker (57) ABSTRACT

Described herein is a mixture comprising: a non-self-crosslinking polymer; and a modifying compound comprising at least two different functional groups. The first functional group of the modifying compound is capable of reacting with the non-self-crosslinking polymer and the second functional group is capable of crosslinking with a curing agent. Also, described are compositions, curable polymeric compositions, articles using such curable polymeric compositions, and methods of making cured polymeric compositions.

15 Claims, 3 Drawing Sheets

POLYMERIC COMPOSITIONS AND METHOD OF MAKING AND ARTICLES THEREOF

CROSS REFERENCE TO RELATED APPLICATION

This application claims the benefit of U.S. Provisional Patent Application No. 61/260,072, filed Nov. 11, 2009, the disclosure of which is incorporated by reference herein in its entirety.

TECHNICAL FIELD

A novel composition comprising a first functional group, which may react with a non-self-crosslinking polymer and a second functional group selected from an azide or an alkyne is described. These compositions may be used in post-polymerization reactions to functionalize a polymer for subsequent crosslinking via an azide-alkyne cure system. Curable polymeric compositions are described as well as the methods of making and using such curable polymeric compositions. For example, these curable polymeric compositions may be used in pressure sensitive adhesive applications.

BACKGROUND

The crosslinking of polymer chains and the density of the crosslinking can be used to alter the physical properties of a given polymer. For example, crosslinking distinguishes a low Tg liquid polymer from an elastomer, and crosslinking can be used to increase the shear or cohesive strength in materials, such as in pressure sensitive adhesives.

Traditionally, there are two different ways of crosslinking polymer chains. The first method involves adding cure-site monomers during the polymerization. Cure-site monomers are incorporated into the polymer chain during the polymerization process. These cure-sites are then subsequently reacted with curing agents to crosslink polymer chains. The second method involves post-polymerization reactions to crosslink the polymer chains.

In post-polymerization reactions, functional sites on an existing polymer are reacted with a molecule (sometimes known as a curative) to connect at least two polymer chains. Typically, the curative comprises at least two of the same reactive groups capable of reacting with functional sites on the existing polymer. Examples of such compounds include: bisamide crosslinking agents as described in U.S. Pat. No. 6,893,718 (Melancon et al.), for example, 1,1'-(1,3-phenylene dicarbonyl)-bis-(2-methylaziridine), 1,4-bis(ethyleneiminocarbonylamino)benzene, 4,4'-bis(ethyleneiminocarbonylamino)diphenylmethane, and 1,8-bis (ethyleneiminocarbonylamino)octane; and diisocyanate-type crosslinking agent, for example, 1,4-tolylene diisocyanate, and hexamethylene diisocyanate (HDI), sold for example, under the trade designation "DESMODUR N-3200" biuret of HDI from Bayer, Pittsburgh, Pa.), "CORONATE L" and "CORONATE L-55E" from Nippon Shokubai Co., LTD., Tokyo, Japan. In these post-polymerization reactions, one of the reactive groups reacts with one polymer chain, while the other group reacts with another polymer chain to crosslink the polymer. Because these compounds comprise at least two of the same reactive groups, the modification and crosslinking of the polymer chains occur under the same reaction conditions. Thus, using these curatives for the crosslinking of polymers post-polymerization may lead to curable polymeric compositions with short pot lives under certain processing conditions (i.e., the curable polymeric compositions begins to prematurely crosslink).

Recently, it has become known to form a 1,3-cyclo-addition of azides with terminal acetylene (also known as a 3+2 cycloaddition) using a copper catalyst at room temperature in what is known as a "click reaction". Katritzky, et al., in *J. Poly. Sci.: Part A*, v. 46, 238-256 (2008), describe the preparation and characterization of end-capped azides and alkynes, wherein the azides were combined in 1,3-dipolar cycloaddition reactions to form triazole linked polymers. These reactions have had limited use in polymeric systems.

In U.S. Prov. application Ser. No. 12/271,222 (Crandall, et al.), a novel cure system for polymers is described comprising azides and non-activated acetylene cure systems. Azido-derivitized and/or acetylene derivitized (meth)acrylate monomers were synthesized and then subsequently used in the polymerization of (meth)acrylate polymers to create crosslinking sites in the polymer chain. These polymers comprising the crosslinking sites were then reacted with the corresponding curing agent at room temperature to crosslink the polymer. For example, a polymer comprising azido cure sites was reacted with a non-activated acetylene curing agent or a polymer comprising non-activated acetylene cure sites.

In *Adv. Funct. Mater.* 2009, 19, 1-7, the use of these 3+2 cycloaddition reactions to generate a polymeric coating were disclosed. In one embodiment, methyl methacrylate was copolymerized with 2-azidoethyl methacrylate via a free radical polymerization. The polymerization failed, which was thought to be a result of the azides reacting with the propagating radicals, resulting in uncontrolled network formation.

SUMMARY

There is a desire to identify a chemical route to crosslink polymers using the azide-alkyne cure system. It is further desirable to identify a process that allows for long pot lives and provides sufficient crosslinking It would be useful to have a method to create a crosslinking system that allows for controllable crosslinking based on readily-available or readily-synthesized polymers.

As disclosed herein, the present disclosure provides the tailoring of polymeric performance in applications such as pressure sensitive adhesives, films, and coatings. Further, the processing features, cohesive strength, tensile, modulus, and adhesion performance also may be improved. By using the compositions and methods of the present disclosure, currently available polymers can be employed without the need to polymerize and manufacture new monomers and/or polymers, which leads to potentially lower costs and faster introduction of variations to the marketplace.

Briefly, in one aspect, the present disclosure provides a mixture comprising a non-self-crosslinking polymer and a modifying compound. The modifying compound comprises a first functional group, capable of reacting with the non-self-crosslinking polymer and a second functional group capable of crosslinking with a curing agent, wherein the first functional group is different than the second functional group.

In one embodiment, the first functional group selected from at least one of an aziridine amide, aziridine urea, an isocyanate, an alcohol, an epoxy, an amine, a sulfhydryl, and non-self-reactive combinations thereof is described.

In one embodiment, the second functional group is selected from an alkyne or an azide.

In yet another aspect, an article is provided comprising a mixture comprising a non-self-crosslinking polymer and a modifying compound. The modifying compound comprises at least two different functional groups: a first functional group capable of reacting with the non-self-crosslinking polymer and a second functional group capable of crosslinking with a curing agent, wherein the first functional group is different than the second functional group.

In another aspect, a curable polymeric composition is provided comprising the reaction product of a mixture comprising a non-self-crosslinking polymer and a modifying compound; and a curing agent. The modifying compound comprises at least two different functional groups: a first functional group capable of reacting with the non-self-crosslinking polymer and a second functional group capable of crosslinking with a curing agent wherein the first functional group is different than the second functional group.

In another aspect, a composition is provided comprising at least one of X—R—(Z)n wherein X is an aziridine amide, aziridine urea, an isocyanate, an alcohol, an epoxy, an amine, or a sulfhydryl, R is a multifunctional organic group, and Z is either —$N_3$ or —C≡CR', wherein R' is a hydrogen or a monofunctional organic group, and n is from one to about 10.

In yet another aspect, a method is provided comprising reacting a non self-crosslinking polymer with a modifying compound to obtain a functionalized polymer, wherein the modifying compound comprises at least two different functional groups: a first functional group capable of reacting with the non-self-crosslinking polymer and a second functional group capable of crosslinking with a curing agent wherein the first functional group is different than the second functional group; and crosslinking the functionalized polymer with a curing agent.

In one embodiment, the reacting and crosslinking are thermally activated.

In another embodiment, the reacting temperature is lower than the crosslinking temperature.

The above summary is not intended to describe each embodiment. The details of one or more embodiments of the invention are also set forth in the description below.

Other features, objects, and advantages will be apparent from the description and from the claims.

DETAILED DESCRIPTION

As used herein, the term

"a", "an", and "the" are used interchangeably and mean one or more;

"and/or" is used to indicate one or both stated cases may occur, for example A and/or B includes, (A and B) and (A or B);

"backbone" refers to the main continuous chain of the polymer; "crosslinking" refers to connecting two pre-formed polymer chains using chemical bonds or chemical groups in order to increase the modulus of the material;

"cure-site" refers to functional groups, which may participate in crosslinking;

"interpolymerized" refers to monomers that are polymerized together to form a polymer backbone; and "(meth)acrylate" refers to compounds containing either an acrylate ($CH_2$=CHCO⁻) or a methacrylate ($CH_2$=$CCH_3$CO⁻) structure or combinations thereof Also herein, recitation of ranges by endpoints includes all numbers subsumed within that range (e.g., 1 to 10 includes 1.4, 1.9, 2.33, 5.75, 9.98, etc.).

Also herein, recitation of integer ranges by endpoints includes all integers subsumed within that range (e.g., 1 to 10 includes 1, 2, 3, 4, 5, etc.).

Also herein, recitation of "at least two" includes all numbers of two and greater (e.g., at least 4, at least 6, at least 8, at least 10, at least 25, at least 50, at least 100, etc.).

Also herein, recitation of "at least one" includes all numbers of one and greater (e.g., at least 2, at least 4, at least 6, at least 8, at least 10, at least 25, at least 50, at least 100, etc.).

In the present disclosure it has been found that reacting non-self-crosslinking polymers with a modifying compound and a corresponding curing agent may be advantageous. For example, because a post-polymerization reaction is used, the choice of polymers is not restricted to, for example, acrylate-based polymers. Further, as described in the present disclosure, functionalization and crosslinking of the polymer may be performed in a single pot. Even further, the non-self-crosslinking polymer(s) may be reacted with the modifying compound under mild conditions and kept in the processable, uncrosslinked state for periods of time awaiting further processing at a higher temperature at a convenient time (i.e., the curable polymeric compositions of the present disclosure may have a long pot life).

As disclosed herein a non-self-crosslinking polymer is a polymer that comprises interpolymerized monomer units. The non-self-crosslinking polymer is not particularly limited as long as the polymer is not self-crosslinking (i.e., it does not react with itself to crosslink). Exemplary polymers include: (meth)acrylates, polyurethanes, polyesters, polysiloxanes, polyolefins, polyethers, polyamides, or combinations thereof In one embodiment, the non-self-crosslinking polymers contemplated in this disclosure may or may not be substantially linear polymers. Substantially linear means that the non-self-crosslinking polymer is a linear polymer that may comprise light to moderate branching, but that the polymer is not a highly-branched (e.g., dendritic) polymer. Quantitatively, substantially linear refers to less than ten branches for every 100 monomer units in the polymer backbone, less than five branches for every 100 monomer units in the polymer backbone, or even one branch for every 100 monomer units in the polymer backbone. In another embodiment, the polymer may be highly-branched (e.g., dendritic).

The non-self-crosslinking polymers of this disclosure may be randomly (e.g., free radically) polymerized. In one embodiment, the non-self-crosslinking polymer may be a copolymer. By copolymer is meant herein a polymer comprising at least two different interpolymerized monomers (i.e., the monomers not having the same chemical structure) and include: terpolymers (comprising three different monomers), tetrapolymers (comprising four different monomers), etc.

In some embodiments, the non-self-crosslinking polymer is hydrophilic. In some embodiments, the non-self-crosslinking polymer is hydrophobic.

In some embodiments, the non-self-crosslinking polymer has a number average molecular weight (Mn) of at least 50,000 dalton, at least 100,000 dalton, at least 300,000 dalton, at least 500,000 dalton, at least 750,000 dalton, at least 1,000, 000 dalton, or even at least 1,500,000 dalton.

The non-self-crosslinking polymer comprises a reaction site. This reaction site may be selected from, for example, a hydroxyl, an amino, a carboxy, an epoxy, a double bond, a ketone, an aldehyde, or non-self-reactive combinations thereof. The reaction site on the polymer backbone is the location where a modifying compound reacts to form a cure-site. In one embodiment, the reaction sites are located along the polymer backbone (i.e., they are not the portion of the polymer where polymerization has initiated or terminated). In one embodiment, the reaction sites are located at the ends (i.e., the portion of the polymer where polymerization has initiated or terminated) of the polymer backbone. Typically the polymer backbone comprises at least 2, 4, 8, 10, 20, 50, 100, 500, 1000, 2000, 3000, 4000, or even 5000 reaction sites.

The modifying compound of the present disclosure comprises a first functional group and a second functional group.

The first functional group is capable of reacting with the reactive site on the non-self-crosslinking polymer in an addition reaction. The first functional group may alternatively react with the reactive site on the polymer in a condensation reaction, such as ester formation from acid and alcohol. This reaction forms a branched polymer with a pendant cure-site. The first functional group is a group that can react via an addition process or a condensation process with a reactive site on the non-self-crosslinking polymer under these mild conditions, but is non-reactive under mild conditions with an alkyne or an azide.

As disclosed herein mild reaction conditions mean for example, temperatures less than 100° C., 80° C., 50° C., 40° C., 30° C. or even at room temperature and without reagents that would cause unwanted side reactions with other moieties in the composition (e.g., polymer, modifying compound, or curing agent).

Exemplary first functional groups include: an aziridine amide, an aziridine urea, an isocyanate, an alcohol, an epoxy, an amine, a sulfhydryl, or combinations thereof. The aziridine may be an aziridine urea of the formula: Az-CO—NH— or an aziridine amide of the formula: Az-CO—, wherein Az is a substituted or an unsubstituted aziridine ring attached via a nitrogen atom. The epoxy may be a substituted or unsubstituted epoxy ring attached via a carbon atom.

In one embodiment, the present disclosure provides a crosslinking process comprising two distinct steps. The first step involves the reaction of the modifying compound with the non-self-crosslinking polymer. The second step involves the crosslinking of polymer chains via the azide and/or alkyne groups introduced during the first step. In one embodiment, this process is conducted in one pot.

In the first step, the first functional group is capable of reacting with the reactive site on the non-self-crosslinking polymer under mild conditions and the first functional group must be selected to not react with the second functional group of the modifying compound under these mild conditions.

In the second step, the second functional group of the modifying compound is capable of crosslinking with a curing agent. The curing agent comprises a third functional group, which reacts with the second functional group to crosslink the polymer. In the present disclosure an azide-alkyne cure system is used.

As disclosed herein, an azide-alkyne cure system refers to the use of azide groups and alkyne groups to crosslink polymer chains. In an azide-alkyne cure system, it is believed that the azide moiety reacts with an alkyne moiety in a 3+2 cycloaddition to form a 1,2,3-triazole. Exemplary alkyne groups include: acetylene —C≡C—H, propargyl —CH₂C≡CH, 2-butynyl —CH₂C≡CCH₃. Alkyne groups are conveniently incorporated into the modifying compound via esterification or urethane formation using an alkyne-containing alcohol. The alkyne group may or may not be non-activated. A non-activated alkyne group, as disclosed herein, means that the alkyne in a particular compound (e.g., a polymer or a curing agent) is connected via an aliphatic carbon group, —CR"₂—, where R" is independently H or a non-interfering organic group, i.e., R" does not sterically or electronically hinder the alkyne group from cycloadding to the azide. R" may be hydrogen, deuterium, a small alkyl group, and so forth. The non-activated alkyne group does not have an electron-withdrawing group, such as a carbonyl group or nitrile linked directly to the carbon atom of the alkyne. In other words, the non-activated alkyne is not —C(=O)—C≡C— or N≡C—C≡C—.

In the present disclosure, the second functional group is selected from an alkyne or an azide, while the third functional group is the corresponding cure pair (i.e., an azide or an alkyne). The reaction of the second functional group with the third functional group crosslinks the polymer via an azide-alkyne cure.

In one embodiment, the modifying compounds include those selected from the following formula:

X—R—(Z)ₙ  (I)

wherein X is the first functional group as described above, R is a multifunctional organic group, and Z, the second functional group as described above, is selected from —N₃ or —C≡C—R', wherein R' is a hydrogen or a monofunctional organic group, and n is from one to about 10.

X may be any group, which is non-reactive under mild conditions with alkynes or with azides as required by the structure X—R—(Z)ₙ, and can react via an addition process or condensation process with a reactive site in the non-self-crosslinking polymer. Examples of X include: aziridine amides, aziridine ureas, isocyanates, alcohols, epoxies, amines, sulfhydryls, or non-self-reactive combinations thereof The multifunctional organic group is not particularly limited. The multifunctional organic group can be any entity that is used to connect the first and second functional groups of the modifying compound, for example, alkyl, cyclic alkyl, aryl, or alkaryl, which may comprise substituted or unsubstituted esters, siloxanes, ureas, urethanes, ethers, amides, hydroxyls, amines, etc. Substituents may include halogens, ionic groups (e.g., ammonium groups), etc. Often the multifunctional organic group will be selected for ease of attachment of the first and second functional groups. For example, a diisocyanate can be reacted with a mole of acetylenic alcohol to form an alkyne-substituted urethane/isocyanate, or a di-acid halide can be reacted first with an azido alcohol, then with 2-methylaziridine, to form an azido substituted ester/aziridine amide.

Exemplary monofunctional organic groups include: alkyl, cyclic alkyl, aryl, or alkaryl, and combinations thereof. These may be substituted with non-interfering groups such as halides, ethers, etc. Examples of monofunctional organic groups include: methyl, ethyl, propyl, butyl, methoxyethyl, and combinations thereof.

Exemplary modifying compounds include: OCNC₆H₇(CH₃)₃CH₂NHCOOCH₂C≡CH, CH₃C₂H₃NC(O)NHC₆H₇(CH₃)₃CH₂HNCOOCH₂C≡CH, OCNC₆H₇(CH₃)₃CH₂NHCOOCH₂CH₂N₃, CH₃C₂H₃NC(O)NHC₆H₇(CH₃)₃CH₂HNCOOCH₂CH₂N₃, and combinations thereof.

These modifying compounds may be used in post-polymerization reactions to functionalize an existing polymer for subsequent crosslinking via an azide-alkyne cure system as described below.

The first functional group of the modifying compound, X, reacts with the reactive site on the non-self-crosslinking polymer to form a curable polymeric composition comprising a crosslink-forming substituent as shown in formula II:

—X'—R—(Z)$_n$ (II)

wherein X' is the reacted first functional group of formula (I) and R, Z, and n in formula (II) have the same meanings as R, Z, and n in formula (I).

Exemplary crosslinkable substituents of the curable polymer include: —C(O)OCH$_2$CHCH$_3$NC(O)NHC$_6$H$_7$(CH$_3$)$_3$CH$_2$HNCOOCH$_2$C≡CH, —C(O)OCH$_2$CHCH$_3$NC(O)NHC$_6$H$_7$(CH$_3$)$_3$CH$_2$HNCOOCH$_2$CH$_2$N$_3$, —OC(O)NHC$_6$H$_7$(CH$_3$)$_3$CH$_2$NHC(O)OCH$_2$C≡CH, —OC(O)NHC$_6$H$_7$(CH$_3$)$_3$CH$_2$NHC(O)OCH$_2$CH$_2$N$_3$, and combinations thereof Typically the reaction of the non-self-crosslinking polymer and the modifying compound is mild, generally less than 100° C., 80° C., 50° C. or even less than 40° C.

In a subsequent step, the second functional group, Z, may then be reacted with the third functional group of the curing agent. The third functional group is the corresponding crosslinking partner of the second functional group, which react together to crosslink the curable polymeric composition via an azide-alkyne cure system. Curing agents including both small molecules and polymers are contemplated in this disclosure.

In one embodiment, the mixture comprises a curable polymeric composition comprising at least two alkyne crosslinkable substituents and an azide curing agent.

The azide curing agent comprises at least two azide groups (i.e., at least two N$_3$ groups). The azide curing agent may be of the formula: G(N$_3$)$_m$ where m is an integer from 2 to about 10 and G is a m-valent organic group, where at least two of the azide (N$_3$) groups are connected via aliphatic carbon atoms, where G may contain other non-interfering organic groups such as alkyl, aryl, alkaryl, hydroxyl, halogens, amine, ammonium, ether, ester, urethane, or other groups that do not interfere with the desired reaction. The azide curing agent may be of low molecular weight such as compounds having a molecular weight of less than 1000, 750, 500, or even 300 molecular weight; oligomers between 1,000 and 20,000 molecular weight, or polymers with greater than 20,000; 25,000; 40,000; 50,000; 100,000; 150,000; 200,000; or even 300,000 molecular weight.

Examples of an azide curing agent include, but are not limited to: CH$_3$CH$_2$C(OCH$_2$CH—OHCH$_2$N$_3$)$_3$, N$_3$CH$_2$CH$_2$O[CH$_2$CH(CH$_2$N$_3$)O]$_6$CH$_3$, CH$_3$CH$_2$C[CH$_2$(OCH$_2$CH(CH$_2$N$_3$))$_2$OCOCH$_3$]$_3$, CH$_3$CH$_2$C[CH$_2$(OCH$_2$CH(CH$_2$N$_3$))$_2$OH]$_3$, N$_3$CH$_2$CH$_2$OCH$_2$CH(OH)CH$_2$N$_3$, poly-urethane of N$_3$CH$_2$CH$_2$OH with polyisocyanate, tris-2-azido-ethyl trimesoate, hexane-1,6-bis-azidoethyl-urethane, polyoxyethylene bis(azide), bis-azide dye, 1,8-diazidooctane, and combinations thereof. Other polyazide compounds are contemplated in this disclosure including those which contain more than 46% by weight nitrogen.

In one embodiment, the azide curing agent is stable (i.e., it does not lose molecular nitrogen to form a nitrene) under the crosslinking conditions (e.g., temperature and time) needed to change the mechanical properties of the polymer.

The curable polymer comprising the alkyne crosslinkable substituent must contain a sufficient quantity of alkyne groups that can act as cure-sites for crosslinking In this embodiment there must be at least two alkyne groups per polymer chain. The amount of alkyne-containing cure-sites in a side chain (or branched) position of the polymer generally is from about 0.01 to about 5 mole percent or even from 0.05 to 3 mole percent relative to the non-self-crosslinking polymer. However, not all of the alkyne cure-sites need to be reacted as long as the desired end properties are achieved.

In another embodiment, the mixture comprises a curable polymeric composition comprising at least two azide crosslinkable substituents and an alkyne curing agent.

The alkyne curing agent comprises at least two alkyne groups. The alkyne curing agent may contain other non-interfering organic groups (such as alkyl, aryl, or alkaryl, which may contain hydroxyl, halogen, ionic, amine, ammonium, ether, urethane, or other groups that do not interfere with the desired reaction). The alkyne curing agent may be of low molecular weight such as compounds having a molecular weight of less than 1000, 750, 500, or even 300 molecular weight; oligomers between 1,000 and 20,000 molecular weight, or polymers with greater than 20,000; 25,000; 40,000; 50,000; 100,000; 150,000; 200,000; or even 300,000 molecular weight.

Examples of alkyne curing agents include, but are not limited to: tris propargyl trimesoate, trimethyladipoyl-bis-propargylate, 1,7-octadiyne, bis-propargyl urethanes, polypropargyl urethanes, activated polyalkynes, such as hexanediol-bis-propiolate, and combinations thereof. Generally, activated polyalkynes crosslink at lower temperatures than the non-activated types.

The curable polymer comprising azide crosslinkable substituents must contain a sufficient quantity of azide groups that can act as cure-sites for crosslinking In this embodiment there must be at least two crosslinkable azide groups in the polymer chain. The amount of azide-containing cure-sites in a side chain position of the polymer generally is from about 0.01 to about 5 mole percent or even from about 0.05 to 3 mole percent relative to the polymer. However, not all of the azide cure-sites need to be reacted, as long as the desired end properties are achieved.

In another embodiment, the mixture may comprise a non-self-crosslinking polymer and two different modifying compounds, wherein the first modifying compound comprises an alkyne and the second modifying compound comprises an azide. The two modifying compounds may be reacted with the non-self-crosslinking polymer to form a curable polymeric composition comprising azide and alkyne crosslinkable substituents. Generally, in this embodiment the polymer backbone must contain at least one azide crosslinkable substituents and at least one alkyne crosslinkable substituents to facilitate crosslinking of the polymer, however, more may be desired if higher crosslink density is needed. As will be discussed below, the reaction of the modifying compound with the non-self-crosslinking polymer and the crosslinking via the azide-alkyne cure system can be selected, such that the modification of the non-self-crosslinking polymer with the modifying compound occurs before the crosslinking reaction.

In yet another embodiment, the mixture comprises at least two different polymers, a first polymer being a non-self-crosslinking polymer modified via post-polymerization as described herein and the second polymer providing the reactive partner groups (alkyne or azide). The second polymer can be made by post-polymerization modification as described herein or by incorporating the either azido or alkyne substituents during the polymerization. These may be viewed as one polymer being the non-self-crosslinking polymer and the other polymer being the curing agent, wherein the one polymer comprises the azide moiety and the second polymer comprises the alkyne moiety. The second polymer may be made by interpolymerizing monomers comprising the corresponding crosslinking partner, or this second polymer may be made by post-functionalization of a non-self-crosslinking polymer and a modifying compound as described above. For example, the mixture comprises a curable polymeric composition comprising at least two azide crosslinkable substituents and a curing agent, wherein the curing agent is a second curable polymeric composition comprising at least two alkyne crosslinkable substituents.

By using different polymers (i.e., the polymers comprises different interpolymerized monomer units), various advantages may be realized. For example, two immiscible polymers may be forced to remain blended via the cure reaction. For example a polar acrylate polymer may be crosslinked with a non polar polymer such as polybutadiene.

In yet a further embodiment of this disclosure, using similar chemistry as described above, a functionally-active compound comprising a functional entity and at least one pendant alkyne group or azide group may be added to the polymeric compositions disclosed herein. In another embodiment, the curing agent may be a compound comprising a functional entity and at least two pendant alkyne groups or azide groups.

The functional entities may include a chemical group, which interacts with the environment in a useful way. For example, the functional entity may: absorb light (such as a dye), modify light (such as a polarizer, photoinitiator, etc.), act as a photostabilizer, act as an antioxidant, act as an imaging tool (such as an imaging molecule), provide a self-healing property, act as a free-radical initiator, lower the surface energy, act as an identifiable marker, provide hydrophilicity or hydrophobicity, absorb and/or emit electric or magnetic field energy, degrade or decompose under controlled conditions, modify adhesion, soften or stiffen a material, etc.

Dyes, for examples, are known to those skilled in the art and can readily be classified by chemical structure, e.g., azo dyes (strong and cost-effective) and anthraquinone dyes (weak and expensive). The types of dyes useful for this disclosure include those that are readily modified to include the azide group or the alkyne group.

The functionally-active compound comprising a functional entity and at least one pendant alkyne group or azide group can be added to the composition before crosslinking Then during crosslinking, the pendant azide group (or alkyne group) of the functionally-active compound would react with the alkyne group (or the azide group) of the polymer as disclosed above to covalently bond the functional entity into the polymer. For example, a functionally-active compound with a pendant azide group would react with the alkyne cure-site of curable polymeric composition to covalently bond the functional entity to the polymer through a triazole linkage. The same techniques could be used to anchor a functional entity to a finished adhesive or coating, for example in an image-wise fashion, to create patterns of different properties (e.g., color). The cured adhesive or coating would have to be made with an excess of either alkyne or azide groups over the number needed to accomplish the curing, and the functional compound would have to comprise the reactive partner azide or alkyne group.

In the embodiments described above, the amount of alkyne to azide generally is in a ratio of 1:1 or higher. However, the amount may be less than 1:1 so as long as there is a sufficient number of azide-alkyne crosslinks to achieve crosslinking It is acceptable to leave some of the alkyne groups or some of the azide groups unreacted if the desired mechanical properties can be achieved.

When employing the azide-alkyne cure systems described above, a dispersing agent such as a hydrocarbon, ester (e.g., ethyl acetate), ketone (e.g., methyl ethyl ketone), or other solvent in which both the polymer and the curing agent are soluble, may be necessary to ensure homogeneous dispersion of the curing agent in the polymer.

A second curing agent may be added after the azide-alkyne cure reaction to impart certain properties. Examples of additional curing agents include, but are not limited to those selected from the group consisting of multifunctional acrylates such as diacrylates, triacrylates, and tetraacrylates, such as 1,6-hexanedioldiacrylate, poly(ethylene glycol)diacrylates, poly(butadiene)diacrylates, polyurethane diacrylates, and trimethylolpropane triacrylate; 4-acryloxybenzophenone; divinyl benzene; and combinations thereof. Preferred crosslinkers are those selected from the group consisting of 1,6-hexanedioldiacrylate (HDDA), poly(ethylene glycol)diacrylates, 4-acryloxybenzophenone, and combinations thereof for reasons of availability.

A second curing agent also may be added to control the polymeric architecture allowing more freedom in attaining a specific desired performance. Additional curing agents, if included, are typically added in a range of about 0.01 to about 0.5 percent by weight, preferably about 0.02 to about 0.1 percent by weight, most preferably about 0.03 to about 0.08 percent by weight, based upon the total weight of monomer included.

The compositions can include any of the adjuvants commonly employed in curable polymer formulations. An organic or inorganic filler may be added to the composition to improve physical properties, such as tensile strength, density, and modulus. Fillers include: carbon black; silica; or other mineral fillers such as hydrotalcite, or barium sulfate, and combinations thereof.

In some embodiments tackifiers and plasticizers may also be added to the composition to increase the bond strength of the polymeric composition in, for example, pressure sensitive adhesives. Tackifiers, include for example, rosin, rosin derivatives, hydrogenated rosin derivatives, polyterpene resins, phenolic resins, coumarone-indene resins, poly-t-butyl styrene and combinations thereof. Plasticizers include for example, hydrocarbon oils, hydrocarbon resins, polyterpenes, rosin esters, phthalates, phosphate esters, dibasic acid esters, fatty acid esters, polyethers, and combinations thereof.

Other optional additives include, for example, stabilizers (e.g., antioxidants or UV-stabilizers), pigments (e.g., dyes), flame retardants, medicaments, and the like. The use of such additives is well known to those of ordinary skill in the art.

Fibers, glass bubbles, and retro-reflective beads may also be added. Fibers can be of several types, generally polymeric or glass. The former can be nylon, polyester, polyamide, epoxy and the like. Glass fibers fall into two types E- and S-glass. E-glass has good insulation properties and maintains its properties up to 1500° F. (815° C.). S-glass has a high tensile strength and is stiffer than E-glass. The fiber type is chosen for its compatibility with the substantially linear copolymer and to provide enhanced properties such as tensile and elongation. Glass bubbles are generally used to lower density, add topology to the substantially linear copolymer coatings or films, reduce cost, and/or to control contact area. A series of glass microbubbles with variation in size and crush strength is available from 3M Co., St. Paul, Minn. In pressure sensitive adhesives, glass bubbles offer the ability to control the initial adhesion by reducing contact until the bubbles are crushed by force and allowing full contact of the adhesive layer.

The curable composition can typically be prepared by mixing the non-self-crosslinking polymer(s), the modifying compound, the curing agent, and any adjuvants (if desired) in conventional processing equipment. This may be done in a solvent or in a solvent-less environment. The desired amounts of compounding ingredients and other conventional adjuvants or ingredients can be added to the curable composition and intimately admixed or compounded therewith by employing any of the conventional mixing devices such as extruders, static mixers, internal mixers, (e.g., Banbury mixers), two roll mills, or any other convenient mixing devices. The temperature of the mixture during the mixing process typically is kept safely below the crosslinking temperature of the composition. Thus, the temperature typically should not rise above about 60° C., about 80° C., or even about 100° C. During mixing, it generally is desirable to distribute the components and adjuvants uniformly.

In one embodiment of this disclosure, the compounded composition may be processed (such as by coating or molding) in a solvent or a solvent-less environment. For example, the azide-containing compound (e.g., the polymer with azide cure-sites) and the alkyne-containing compound (e.g., the curing agent) may be coated without the presence of a solvent, or may be coated in the presence of a solvent. The solvent may be removed, for example, by thermal evaporation. Additionally, the amount of solvent in the compounded composition may be adjusted, depending on the application so as to obtain a desired viscosity of the composition. For example, in pressure sensitive adhesive applications, the viscosity may be adjusted to obtain a desired flow rate for the process.

In one embodiment of this disclosure, the curable polymeric compositions may be compounded and/or processed (such as by coating or molding) in the presence of water. Because the reaction of the azide group and the alkyne group is not sensitive to water, there may be no need to take special precautions to prevent moisture from being present. For example, there may be no need to dry fillers or other reactants, or control the humidity of the reaction atmosphere. Because of the water insensitivity, the non-self-crosslinking polymer may be made in latex form and processed without the use of organic solvents, which may be environmentally advantageous.

For polymers such as those used in PSAs or coatings, having a high enough molecular weight to attain acceptable performance properties is needed. In making polymers in solvent, the molecular weight must not be so high in that there is gel formed. Gel formation means there is no practical way to use the polymer solution as there is limited flow as well as uneven spreading when making a coating. Typically a measurement of inherent viscosity (IV) is used to gauge the molecular weight in a capillary flow device.

The compounded compositions of this disclosure may be crosslinked via thermal activation. Thus, when the heat is removed, the composition does not further cure. Temperatures for crosslinking include those above 100° C. or even above 140° C. In some embodiments, a metal catalyst may not be used in the reaction of the azide with the alkyne. In some embodiments, a metal catalyst may be used to catalyze the azide-alkyne reaction. Examples of such metals catalysts include metal and metal salts such as those including: copper, nickel, palladium, and platinum. Co-catalysts may also be employed such as $Cu(OAc)_2$/sodium ascorbate or $Cu(II)SO_4$/sodium ascorbate.

In one embodiment, the reaction of the non-self-crosslinking polymer with the modifying compound and the crosslinking reaction are both thermally activated. In one embodiment, the reaction of the non-self-crosslinking polymer with the modifying compound occurs at a temperature of at least 0° C., 10° C., 15° C., 20° C., 25° C., 30° C. 35° C., 40° C., 45° C., 50° C., 60° C., 70° C., 80° C., 90° C., 100° C., or even 110° C.; at most 50° C., 60° C., 70° C., 80° C., 90° C., 100° C., 110° C., 120° C., or even 130° C. In one embodiment, the crosslinking of the azide with the alkyne in the curable polymeric composition occurs at a temperature of at least 20° C., 25° C., 30° C., 35° C., 40° C., 45° C., 50° C., 90° C., 100° C., 110° C., 120° C., or even 130° C.: at most 80° C., 90° C., 100° C., 110° C., 120° C., 140° C., 150° C., 160° C., 180° C., 190° C., 200° C., 220° C., 240° C., 250° C., or even 260° C.

In one embodiment, the reaction of the non-self-crosslinking polymer with the modifying compound occurs at a lower temperature than the crosslinking of the azide and the alkyne. In one embodiment, the temperature may be 10° C., 20° C., 30° C., 40° C., 50° C., 60° C., 80° C., 100° C., or even 120° C. lower or more.

The ability to control the functionalization reaction and the crosslinking reactions may lead to advantages including, for example, longer pot lives, more choices in processing equipment, reduced clean-up difficulty if there is a process interruption, etc.

In one embodiment, the compositions of this disclosure may be applied in adhesive or coating applications, or used as structural polymers, such as fiber reinforced composites, filled polymers, etc.

In coating applications, for example, a layer of the curable polymeric composition disclosed above is applied to a substrate to provide or modify the substrate's features such as color, adhesion, surface finish, surface energy, scratch resistance, abrasion resistance, chemical resistance, weatherability, and so forth.

In filled polymers, for example, a discontinuous material (e.g., filler) is incorporated into the matrix (e.g., the curable polymeric composition) to provide features, advantages, and benefits above and beyond those available from each of the separate components. In reinforced composites, for example, fillers are added to the curable polymeric composition to improve the mechanical properties of the non-self-crosslinking polymer. In a structural article, the physical properties of the cured material are designed so as to provide dimensional control of the article, as well as the strength and amount of stiffness required. A structural article may also be a unitary (non-assembled) item such as an injection-molded object like a comb, a hand-held magnifier, a stop for a parking space, etc.

In one embodiment of this disclosure, the curable polymeric composition is used as an adhesive in, for example, a PSA (pressure sensitive adhesive).

The curable polymeric compositions prepared in accordance with the present disclosure are easily coated upon suitable flexible or inflexible backing materials by conventional coating techniques to produce adhesive coated sheet materials in accord with the present disclosure. The flexible backing material may be any material conventionally utilized as a tape backing or any other flexible material. Typical examples of flexible backing materials employed as conventional tape backings, which may be useful for the adhesive compositions of the present disclosure include those made of paper, plastic films such as polypropylene, polyurethane, polyethylene, polyvinyl chloride, polyester (e.g., polyethylene terephthalate), cellulose acetate, and ethyl cellulose.

Backings may also be prepared of fabric such as woven fabric formed of threads of synthetic or natural materials such as cotton, nylon, rayon, glass, ceramic material, and the like or nonwoven fabric such as air laid webs of natural or synthetic fibers or blends of these. The backing may also be formed of metal, metalized polymeric films, or ceramic sheet materials. The coated sheet materials may take the form of any article conventionally known to be utilized with PSA compositions such as labels, tapes, signs, covers, marking indicia, and the like.

These coated papers or thermoplastic films are often siliconized or otherwise treated to impart improved release characteristics. One or both sides of the backings or liners could have such release characteristics. Generally the backing or substrate material is about 50 μm (micrometer) to about 155 μm in thickness, although thicker and thinner backing or substrate materials are not precluded.

The PSA compositions of the present invention may be coated by any of a variety of conventional coating techniques known in the art, such as roll coating, spray coating, knife coating, extrusion, die-coating, and the like.

An advantage of using the composition of this disclosure is that a solvent-less adhesive or coating may be generated. Further, the cohesive strength, tensile, modulus, and adhesion performance of the adhesive also may be improved.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Corporation, St. Louis, Mo., or known to those skilled in the art unless otherwise stated or apparent.

These abbreviations are used in the following examples: g=grams, min=minutes, mol=mole; mmol=millimole, hr=hour, s=second, mm=millimeter, mL=milliliter, dl/g (100 mL/g), L=liter, and FT-IR=Fourier transform infrared spectroscopy.

Methods

Rheometry Method—Using a stress-strain controlled rheometer, AR2000, (TA Instruments, New Castle, De.) samples were placed between two 20 mm parallel plates. The bottom plate was heated to 160° C. and the temperature was swept from 25° to 125° C. for the duration of the experiment. The top plate was oscillated with a frequency of 1 Hertz and strain of 1% of 2 mm to generate the elastic modulus of the test sample. Oscillation and measurement of elastic modulus was then repeated at 20° C. integrals over a temperature range from 5° C. to 145° C. Sample temperature was allowed to equilibrate for 1 minute before oscillation and measurement of elastic modulus. Data was then stored as elastic modulus (G') in Pascals (Pa) vs. temperature (° C.) and plotted as log G' versus temperature.

Inherent Viscosity—The inherent viscosities (IV) reported herein were obtained by conventional methods used by those skilled in the art. The IVs were obtained using a Cannon-Fenske #50 viscometer (Cannon Instrument Co., State College, Pa.) in a water bath controlled at 25° C. to measure the flow time of 10 mL of a polymer solution (0.2 g per deciliter polymer in ethyl acetate). The test procedure followed and the apparatus used are described in detail in Textbook of Polymer Science, F. W. Billmeyer, Wiley-Interscience, Second Edition, 1971, pages 84 and 85.

Peel Adhesion—The 180 degree peel adhesion used was based on the PSTC-101 (Pressure Sensitive Tape Council) test standard, revised May 2007. A 0.5 inch (1.27 cm) wide strip of sample tape was adhered to a glass plate by rolling a 4.5 pound (2 kg) roller onto the sample tape. The bonded assembly dwelled for five minutes at about 73.4° F. (23° C.) and about 50% relative humidity. The test sample was then peeled at an angle of 180° and a speed of about 90 inches (230 cm) per minute, using a Lloyd, Instron or IMASS peel test machine. The peel force was measured in ounces per inch width and converted to Newtons per decimeter (N/dm).

Static Shear—The static shear was based on the PSTC-107 test standard, revised May 2007. A 0.5 inch square (1.3 cm$^2$) of sample tape was adhered to #304 stainless steel plate to test for holding power or cohesive strength. A weight of 4.5 pound (2.0 kilogram) was rolled over the adhered portion. A 1 kilogram weight was attached to each sample which was suspended until the sample failed. The test was run at about 73.4° F. (23° C.) and about 50% relative humidity conditions. The time of failure as well as the mode of failure was noted. The samples were run in duplicate and, unless otherwise stated, the average result was reported. "Cohesive" failure means that adhesive is left both on the steel plate and the film. "Pop-off" or adhesive failure means that no adhesive is left on either the steel plate or the film. A value of 10000+ means that the test was stopped after 10000 minutes with no evidence of failure.

Reagents

Azido-isocyanate—To a solution of 22.2 g of isophorone diisocyanate (Bayer, Pittsburgh, Pa.) and 8.7 g of 2-azidoethanol (prepared as described in U.S. Prov. application Ser. No. 12/271,222, Crandall, et al.) in 100 g toluene was added 0.05 g of dibutyltin dilaurate. An exothermic reaction was observed which raised the temperature of the mixture to 45° C. The mixture was further heated to 65° C. for 30 minutes and then cooled to room temperature. The structure was confirmed by FT-IR spectroscopy. Peaks were assigned as 2267/cm, isocyanate; 2104/cm, azido group, and 1708/cm, urethane carbonyl.

Propargyl-isocyanate—To a solution of 22.2 g of isophorone diisocyanate and 5.6 g of propargyl alcohol in 100 g toluene was added 0.05 g of dibutyltin dilaurate. An exothermic reaction was observed which raised the temperature of the mixture to 45° C. The mixture was further heated to 65° C. for 30 minutes and then cooled to room temperature. The structure was confirmed by FT-IR spectroscopy. Peaks were assigned as 2268/cm, isocyanate; 2128/cm (small), alkyne; and 1712/cm urethane carbonyl.

Azido-aziridine—To a solution of 22.2 g of isophorone diisocyanate (Bayer, Pittsburgh, Pa.) and 8.7 g of 2-azidoethanol (prepared as described in U.S. Prov. application Ser. No. 12/271,222, Crandall, et al.) in 100 g toluene was added 0.05 g of dibutyltin dilaurate. An exothermic reaction was observed which raised the temperature of the mixture to 45° C. The mixture was further heated to 65° C. for 30 minutes and then cooled to room temperature. To 64 g of this mixture was added 3.0 g of 2-methyl aziridine in small portions, keeping the temperature below 30° C. The product was freed of solvent on a rotary evaporator, leaving a colorless viscous liquid. The structure was confirmed by FT-IR spectroscopy. Peaks were assigned as 3301/cm, N—H; 2953/cm, C—H; 2104/cm, azido group; 1706/cm urethane carbonyl; and 1669/cm urea carbonyl. All isocyanate (2266/cm) had been reacted out.

Propargyl-aziridine—To a solution of 22.2 g of isophorone diisocyanate and 5.6 g of propargyl alcohol in 100 g toluene was added 0.05 g of dibutyltin dilaurate. An exothermic reaction was observed which raised the temperature of the mixture to 45° C. The mixture was further heated to 65° C. for 30 minutes, then cooled to room temperature. To 65.5 g of this mixture was added 3.0 g of 2-methyl aziridine in small portions, keeping the temperature below 30° C. The product was freed of solvent on a rotary evaporator, leaving a pale yellow viscous liquid. The structure was confirmed by FTIR spectroscopy. Peaks were assigned as 3330/cm, N—H; 2954/cm, C—H; 2125/cm -very small, C—C triple bond; 1710/cm, urethane carbonyl; and 1669/cm, urea carbonyl. All isocyanate (2266/cm) had been reacted out.

Isooctyl acrylate/acrylic acid (IOA/AA)—was prepared by mixing 93 parts isooctyl acrylate and 7 parts acrylic acid and 0.07% 2,2'-azobis(2-methylbutyronitrile) (sold under the trade designation "VAZO 67" by DuPont Chemicals, Wilmington, Del.) in ethyl acetate at 47%. The mixture was reacted at 59 C for 24 hours and then diluted with ethyl acetate and heptane to form a solution in a 67/33 ethyl acetate/heptane solution to give a 25% solids mixture. The copolymer had an inherent viscosity of 1.6 dL/g (deciliter per gram).

Polyester polyol—molecular weight 1500, available under the trade designation "LEXOREZ 1405-65" from Inolex Chemical Co., Philadelphia, Pa.

Polyurethane—prepared as described in Example 6 of U.S. Pat. No. 5,759,666 (Carlson, et al), Mw=25,000, Mn=12,500.

Iso-octyl acrylate/hydroxyethyl methacrylate copolymer (IOA/HEMA)—A mixture containing 37% solids comprising 135 parts of iso-octyl acrylate, 15 parts hydroxyethyl methacrylate, 600 mg (0.4%) of 2,2'-azobis(2-methylbutyronitrile) in a 62/38 (wt/wt) % solution of ethylacetate/toluene was purged with nitrogen and polymerized at 63° C. for 15 hours followed by 3 hours at 70° C. to yield a 90/10 IOA/HEMA copolymer.

Acrylonitrile-butadiene copolymer obtained from CVC Thermoset Specialties, Moorestown, N.J., under the trade designation "HYPRO REACTIVE LIQUID POLYMER CTBN 1300X13" described as a carboxyl terminated butadiene-acrylonitrile polymer comprising 26% acrylonitrile with a Tg of −39° C., acid number of 32, and $M_n$ of 3150.

EXAMPLES

Comparative Example A

A sample was made by using 8.0 grams IOA/AA. The sample was coated onto a liner (polycoated paper liner with a low enough release to allow removal of dried sample) and air dried at room temperature for 24 hours.

Example 1

A sample was made by mixing 8.0 grams IOA/AA and equal parts azido-aziridine (0.6 g) and propargyl-aziridine (0.6 g). The sample was coated onto a liner (polycoated paper liner with a low enough release to allow removal of dried sample) and air dried at room temperature for 24 hours.

Figure 1:
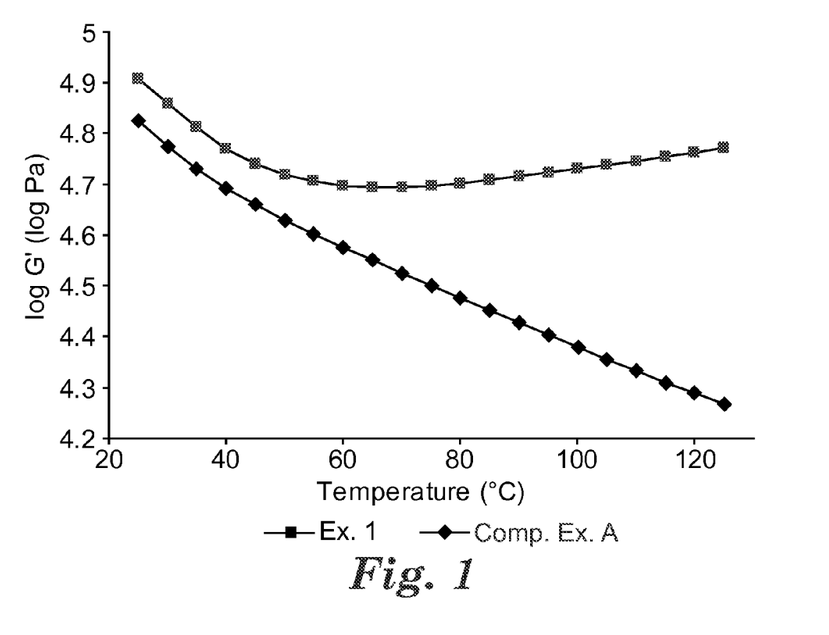
FIG. 1 is a graph of log G' versus temperature for Example 1 and Comparative Example A.

Comparative Example A and Example 1 were removed from the liner, loaded onto a rheometer probe and tested following the Rheometer Method above. Shown in FIG. 1 is a graph of G' versus time for Comparative Example A (Comp. Ex. A) and Example 1 (Ex. 1). As shown in FIG. 1, Comparative Example A shows a drop in modulus as the temperature is increased, as expected for a non-crosslinked polymer. Example 1, which contains the crosslinkable moieties, shows a marked increase in modulus after about 50° C., indicating the crosslinking i.e., cylcoaddition reaction, was occurring.

Example 2

The IOA/AA (25 g) was mixed with equal parts of azido-aziridine, (0.3 g) and propargyl-aziridine (0.3g). The solids were lowered to 20% with ethyl acetate (6.4g) and mixed for 20 minutes. The solution was coated onto 2 mil (50.8 micrometer) poly(ethylene terephthalate) with a target dry weight of 1 mil (25.4 micrometer). Three samples (Sample 1, Sample 2, and Sample 3) were made and dried at 65° C. for 30 minutes. Then Sample 2 was heated at 105° C. for 30 minutes while Sample 3 was heated at 130° C. for 30 minutes. All three samples were placed in a controlled temperature and humidity room (70° F. (21.1° C.) and 50% relative humidity) overnight to equilibrate. The samples were cut and tested for Peel Adhesion and Static Shear. The results are reported in Table 2.

As shown in Table 2 below, Sample 3 displayed a pop-off failure, indicating that the crosslinking of the polymeric composition was stronger than the adhesive force to the substrates (i.e, the stainless steel and the poly(ethylene terephthalate)).

Example 3

IOA/AA (25 g) was mixed with equal parts azido-aziridine (0.18 g) and propargyl-aziridine (0.18 g). The solids were lowered to 20% (wt.) with ethylacetate (6.4 g) and mixed for 20 minutes. The solution was coated onto 2 mil (50.8 micrometer) poly(ethylene terephthalate) with a target dry weight of 1 mil (25.4 micrometer). Three samples (Sample 1, Sample 2, and Sample 3) were made and dried at 65° C. for 30 minutes. Then Sample 2 was heated at 105° C. for 30 minutes while Sample 3 was heated at 130° C. for 30 minutes. All three samples were placed in a controlled temperature and humidity room (73.4° F. (23° C.) and 50% relative humidity) overnight to equilibrate. The samples were cut and tested for Peel Adhesion and Static Shear. The results are reported in Table 3.

Comparative Example B

Comparative Example B was prepared as in Example 3 above, but no azide-aziridine or propargyl-aziridine was added.

TABLE 2

| | Results | | |
|---|---|---|---|
| | Peel Adhesion in oz/inch (N/dm) | Static Shear In min | Shear failure mode |
| Example 2 Sample 1 | 73.7 (520.4) | 6200 | 85% of sample pop-off, 15% of sample cohesive |
| Example 2 Sample 2 | 72.2 (509.8) | 3800 | 75% of sample pop-off, 25% of sample cohesive |
| Example 2 Sample 3 | 67.1 (473.8) | 1190 | Pop-off |
| Comp. Ex. B | 71 (501.4) | 43 | cohesive |
| Example 3 Sample 1 | 70 (494.3) | 10000+ | Not applicable |
| Example 3 Sample 2 | 69 (487.2) | 10000+ | Not applicable |
| Example 3 Sample 3 | 66 (466.1) | 7315 10000+ | Pop-off Not applicable |

Examples 4-8

Figure 2:
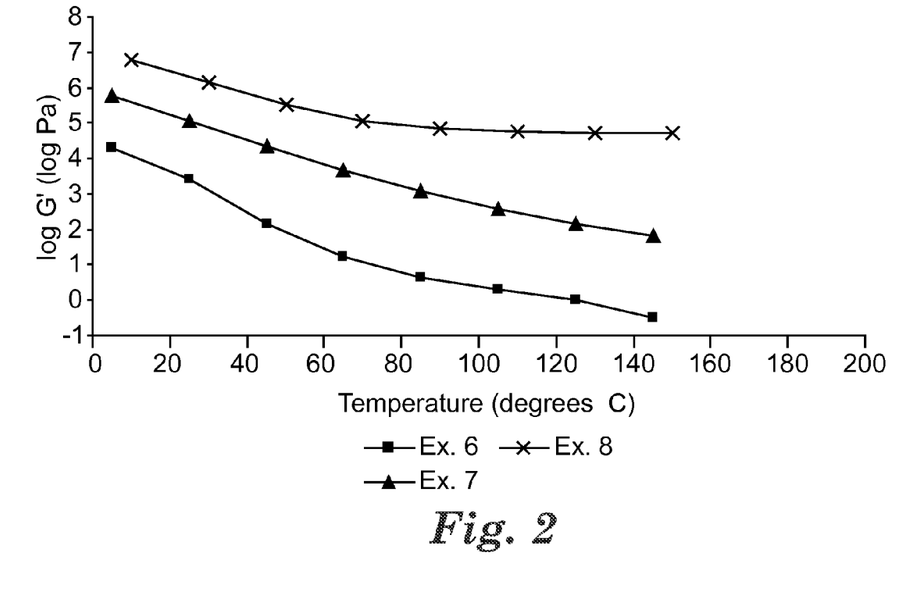
FIG. 2 is a graph of log G' versus temperature for Examples 6-8.

Polyester polyol (9 g) was diluted to 75% solids in toluene. A 50% solid solution of propargyl-aziridine and a 50% solid solution of azido-aziridine were prepared in toluene and mixed into the polyester polyol solutions according to Table 3 below. Samples were mixed for 15 minutes then dried of solvent at 105° C. for 2-4 hours. The samples were then cured at 130° C. for 2-4 hours. Shown in Table 3 below are the observations of the physical characteristics of the resulting sample. Shown in FIG. 2, is a graph of log G' versus temperature for Examples 6-8.

Examples 9-11

Polyurethane (10 g) was diluted to 40% solids in methyl ethyl ketone. A 50% solid solution of propargyl-aziridine and a 50% solid solution of azido-aziridine were prepared in methyl ethyl ketone and mixed into the polyurethane solutions according to Table 3 below. Samples were mixed for 15 minutes then dried of solvent at 105° C. for 2-4 hours. The samples were then cured at 130° C. for 2-4 hours. Shown in Table 3 below are the observations of the physical characteristics of the resulting samples.

Comparative Example C

Figure 3:
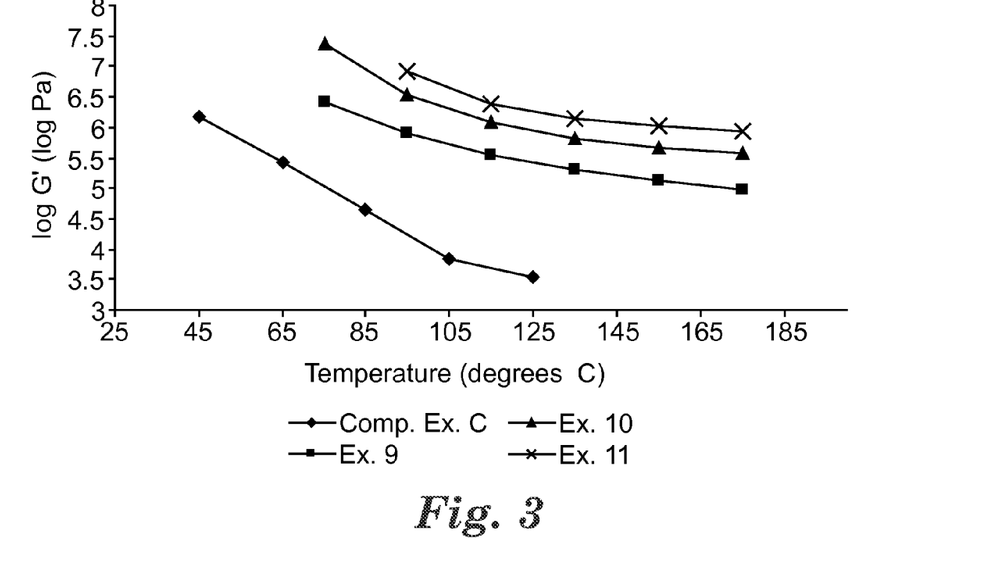
FIG. 3 is a graph of log G' versus temperature for Examples 9-11 and Comparative Example C.

Polyurethane (10 g) was diluted to 40% solids in methyl ethyl ketone. The sample was mixed for 15 minutes then dried of solvent at 105° C. for 2-4 hours. Shown in Table 3 below are the observed physical characteristics of the resulting sample. Shown in FIG. 3, is a graph of log G' versus temperature for Examples 9-11 (Ex. 9-11) and Comparative Example C (Comp. Ex. C).

TABLE 3

| Example | Wt % (dry/dry)* |
|---|---|
| 4 | 1.5 |
| 5 | 4 |
| 6 | 8 |
| 7 | 15 |
| 8 | 25 |
| 9 | 5 |
| 10 | 10 |
| 11 | 15 |
| Comp. Ex. C | Not applicable |

*equal parts propargyl-aziridine and azido-aziridine used

Examples 12-14

Figure 4:
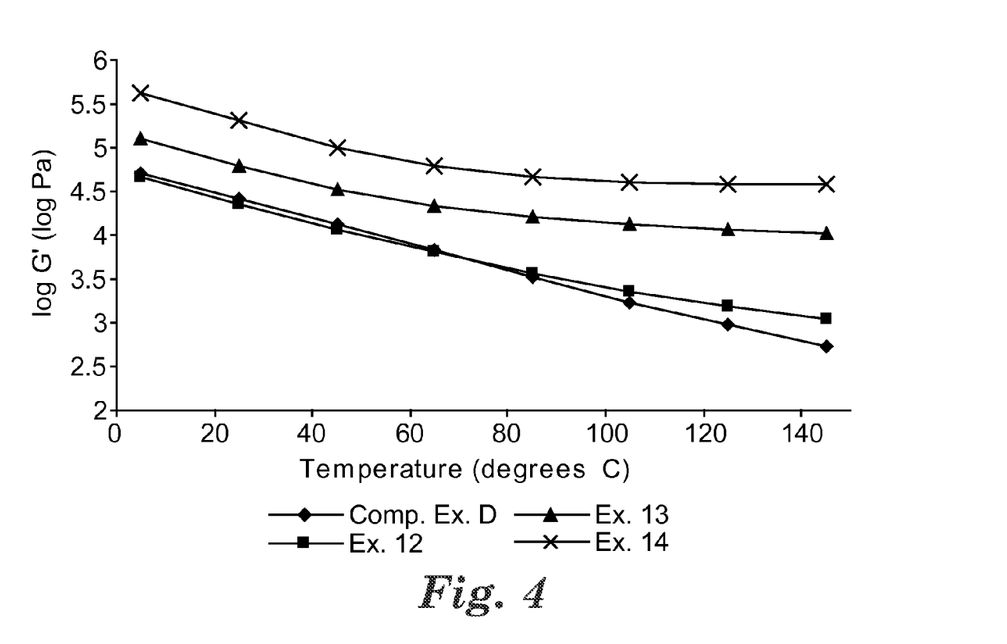
FIG. 4 is a graph of log G' versus temperature for Examples 12-14 and Comparative Example D.

IOA/HEMA and a 24% (wt/wt) solution of propargyl-isocyanate and azido-isocyanate were prepared in toluene and mixed according to Table 4 below to create various amount of crosslinking Samples were mixed for 5 minutes at ambient temperatures then dried of solvent at 105° C. for 30 min. The samples were then cured at 130° C. for 2 hours. Shown in FIG. 4 are the log G' versus temperature for each sample.

TABLE 4

| Example | Wt % (dry/dry)* |
|---|---|
| 12 | 0.5 |
| 13 | 2 |
| 14 | 5 |

*equal parts propargyl-isocyanate and azido-isocyanate used

Comparative Example D

IOA/HEMA was diluted in methyl ethyl ketone. The sample was mixed for 5 minutes then dried of solvent at 105° C. for 30 min. The samples were then cured at 130° C. for 2 hours. Shown in FIG. 4, is a graph of log G' versus temperature for Examples 12-14 (Ex. 12-14) and Comparative Example D (Comp. Ex. D).

Examples 15-18

Polymer 1: Acrylonitrile-butadiene copolymer (9.5 g) was diluted to 75% solids in ethyl acetate. The propargyl-aziridine (3.47 g, 50% by wt in toluene) was added to the acrylonitrile-butadiene copolymer solution and mixed at ambient temperatures for 15 min to create an alkyne functionalized acrylonitrile-butadiene copolymer. The mixture was dried of solvent at 105° C. for 2 hours.

Polymer 2: IOA/AA was mixed with the azido-aziridine to create an azide functionalized acrylate polymer.

Polymers 1 and 2 were then combined according to Table 5 below. Samples were poured onto a release liner after 5 minutes of mixing and cured at 65° C. for two hours, followed by 30 minutes 105° C., followed by 1 hour at 130° C. The samples were stored in a controlled temperature and humidity environment as described above.

TABLE 5

| Examples | IOA/AA | Polymer Wt (25% solids) | Propargyl-aziridine (10% solids) | Azido-aziridine (50% solids) |
|---|---|---|---|---|
| 15 | 10.3 | 2.58 | 10% | 500 mg |
| 16 | 10.4 | 2.60 | 1% | 50 mg |
| 17 | 10.6 | 2.65 | 2% | 100 mg |
| 18 | 10.5 | 2.63 | 5% | 260 mg |

Comparative Example E

Comparative Example E was prepared as described in Examples 15-19 above, except that no azido-aziridine or proparyl-aziridine was added.

Figure 5:
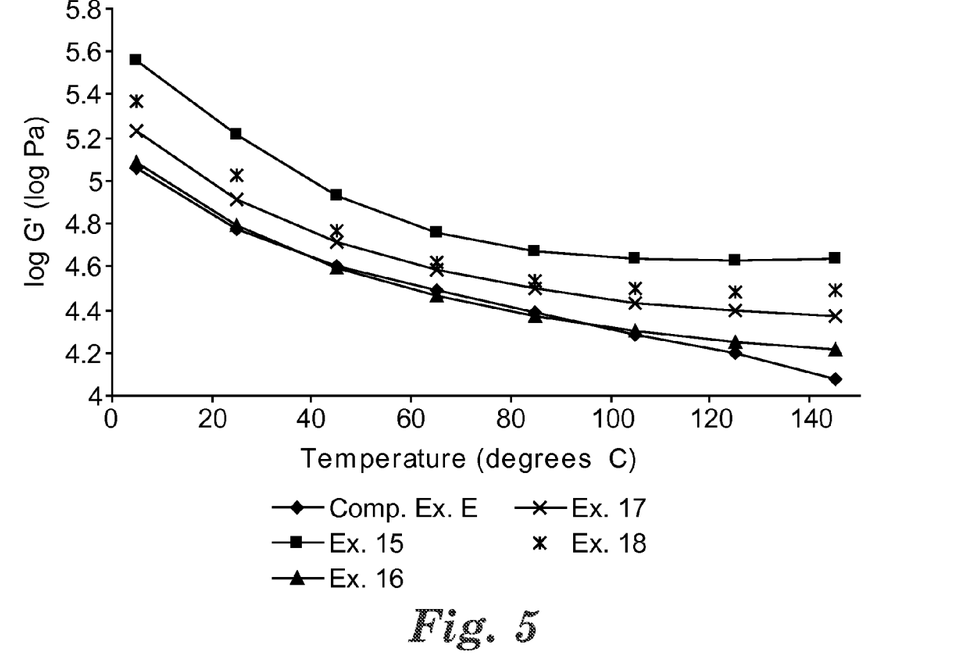
FIG. 5 is a graph of log G' versus temperature for Examples 15-18 and Comparative Example E.

Shown in FIG. 5, is a graph of log G' versus temperature for Examples 15-18 (Ex. 15-18) and Comparative Example E (Comp. Ex. E), which contained no curing agent.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A mixture comprising:
    (a) a non-self-crosslinking polymer; and
    (b) a modifying compound selected from at least one of: $CH_3C_2H_3NC(O)NHC_6H_7(CH_3)_3$ $CH_2HNCOOCH_2C\equiv CH$, $CH_3C_2H_3NC(O)NHC_6H_7(CH_3)_3CH_2HNCOOCH_2CH_2N_3$, $OCNC_6H_7(CH_3)_3CH_2NHCOOCH_2C\equiv CH$, $OCNC_6H_7(CH_3)_3CH_2NHCOOCH_2CH_2N_3$, or combinations thereof, the modifying compound comprising:
    (i) a first functional group capable of reacting with the non-self-crosslinking polymer and;
    (ii) a second functional group capable of crosslinking with a curing agent,
    wherein the first functional group is different than the second functional group.

2. The mixture of claim 1, wherein the first functional group is selected from an aziridine urea, or an isocyanate.

3. The mixture of claim 1, wherein the non-self-crosslinking polymer comprises a reaction site selected from at least one of a hydroxyl, an amino, a carboxy, an epoxy, a double bond, a ketone, an aldehyde, or non-self-reactive combinations thereof.

4. The mixture of claim 1, wherein the non-self-crosslinking polymer is selected from at least one of: (meth)acrylates, polyurethanes, polyesters, polysiloxanes, polyolefins, polyethers, polyamides, or combinations thereof.

5. The mixture of claim 1, further comprising a curing agent, wherein the curing agent comprises a third functional group, wherein the third functional group may react with the second functional group to crosslink the curable polymer composition.

6. The mixture of claim 5, wherein the second functional group and third functional group form an azide-alkyne crosslink.

7. The mixture of claim 5, wherein the curing agent is an azide curing agent having a molecular weight of less than 1,000.

8. The mixture of claim 5, wherein the curing agent is a second polymer.

9. The mixture of claim 8, wherein the second polymer is different than the non self-crosslinking polymer.

10. The mixture of claim 1, further comprising a compound selected from a dye, a polarizer, a photoinitiator, a photostabilizer, an antioxidant, a free-radical initiator, a hydrophilic compound, a hydrophobic compound, an electric field absorber, an electric field emitter, a magnetic field absorber, a magnetic field emitter, or an adhesion modifier, wherein the compound comprises a functional entity and at least one pendant alkyne group or azide group.

11. A curable polymeric composition comprising: a reaction product of the mixture according to claim 1 and a curing agent.

12. A method comprising:
(a) providing the mixture according to claim 1;
(b) reacting the non self-crosslinking polymer and the modifying compound to obtain a functionalized polymer; and
(c) crosslinking the functionalized polymer with a curing agent.

13. The method of claim 12, wherein the reacting and crosslinking are thermally activated.

14. The method of claim 12, wherein the reacting temperature is lower than the crosslinking temperature.

15. The method of claim 12, wherein the reacting temperature is about 0° C. to 100° C.

* * * * *

UNITED STATES PATENT AND TRADEMARK OFFICE
CERTIFICATE OF CORRECTION

PATENT NO. : 8,703,877 B2
APPLICATION NO. : 12/943116
DATED : April 22, 2014
INVENTOR(S) : Anthony Manzara It is certified that error appears in the above-identified patent and that said Letters Patent is hereby corrected as shown below:

In the Specification

Column 2
Line 38, delete "crosslinking" and insert -- crosslinking. --, therefor.

Column 3
Line 22, delete "non self-crosslinking" and insert -- non-self-crosslinking --, therefor.

Column 4
Line 5, delete "thereof" and insert -- thereof. --, therefor.
Line 38, delete "thereof" and insert -- thereof. --, therefor.

Column 6
Line 38, delete "thereof" and insert -- thereof. --, therefor.

Column 7
Line 16, delete "thereof" and insert -- thereof. --, therefor.
Line 64, delete "crosslinking" and insert -- crosslinking. --, therefor.

Column 8
Line 29, delete "crosslinking" and insert -- crosslinking. --, therefor.

Column 9
Line 41, delete "crosslinking" and insert -- crosslinking. --, therefor.
Line 61, delete "crosslinking" and insert -- crosslinking. --, therefor.

Column 11
Lines 66-67, delete "110°C.;" and insert -- 110°C.: --, therefor.

Signed and Sealed this
Twenty-second Day of July, 2014

Michelle K. Lee
*Deputy Director of the United States Patent and Trademark Office*

CERTIFICATE OF CORRECTION (continued)
U.S. Pat. No. 8,703,877 B2

Column 17
Line 40, delete "crosslinking" and insert -- crosslinking. --, therefor.

In the Claims

Column 19
Line 13, in Claim 9, delete "non self-crosslinking" and insert -- non-self-crosslinking --, therefor.

Column 20
Line 8, in Claim 12, delete "non self-crosslinking" and insert -- non-self-crosslinking --, therefor.